Figure 1:
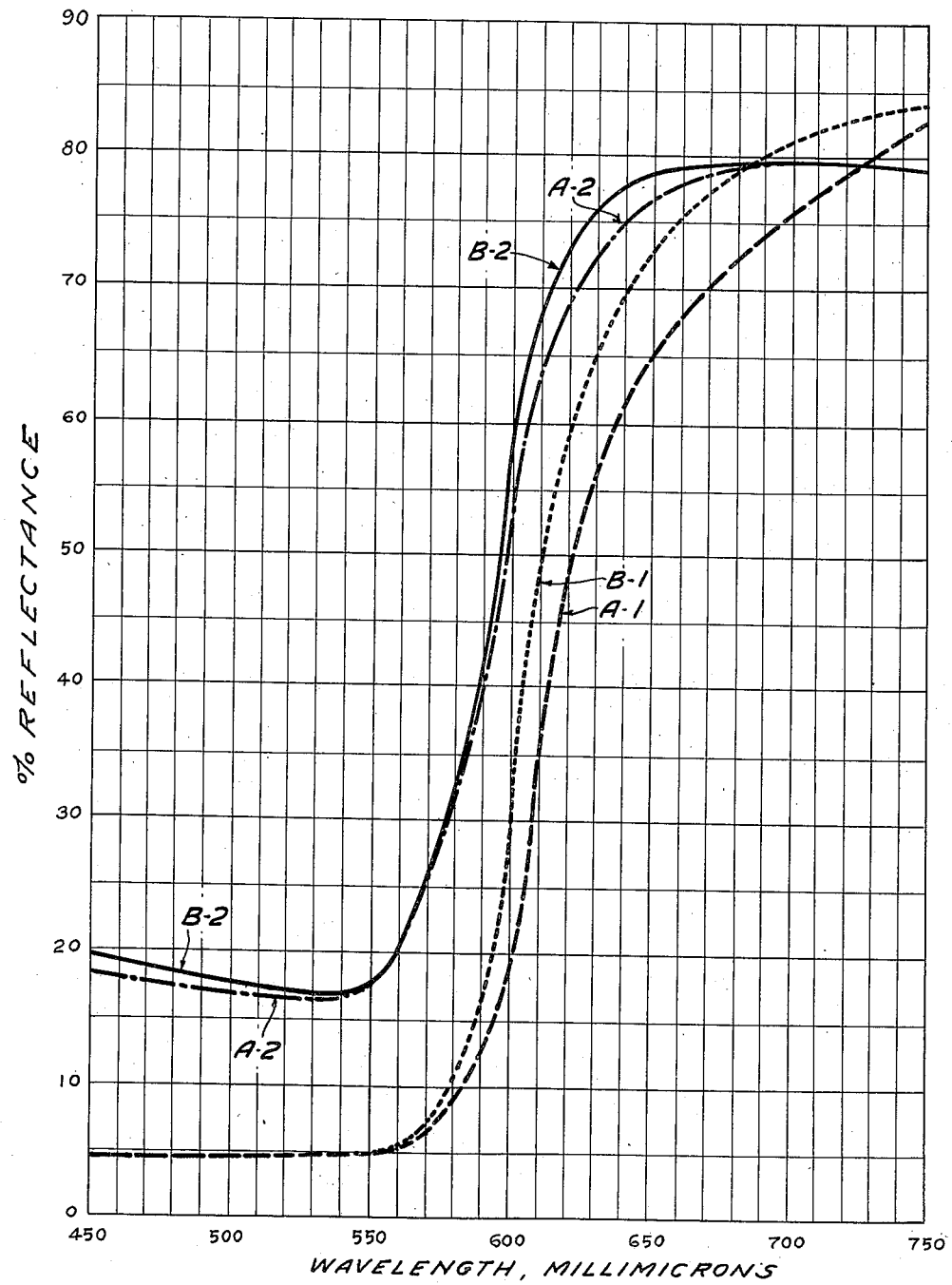

Patented Feb. 7, 1950

2,496,588

UNITED STATES PATENT OFFICE 2,496,588

CONTROLLED FLUX IN CALCINING CADMIUM PIGMENT CRUDE

Guy C. Marcot, Lynchburg, Va., assignor to American Cyanamid Company, New York, N. Y., a corporation of Maine Application June 28, 1946, Serial No. 680,100

4 Claims. (Cl. 106—301)

This invention relates to the production of Cadmium Red pigments and is concerned particularly with a method of preparing a composite of controlled flux content which composite on calcination yields a pigment of optimum quality. The invention also relates to pigments so produced.

As used in the present invention, the term "cadmium red pigments" is used to designate any of a variety of calcined products ranging in color from bright orange to a dark maroon and containing both CdS and CdSe. These components appear to form a solid solution in the finished pigment, constituting the principal colored constituent thereof. Control of the color shade is obtained by varying the relative proportions of CdS and CdSe in the solid solution, approximately as indicated in the following table:

TABLE I

| Shade | CdS:CdSe Ratio | |
|---|---|---|
|  | Percent CdS | Percent CdSe |
| Orange | 70 | 30 |
| Light Red | 60 | 40 |
| Dark Red | 48 | 52 |
| Maroon | 41 | 59 |
| Deep Maroon | 35 | 65 |

While these proportions are known, various shades having been previously obtained by a number of proposed methods, these methods have not been wholly satisfactory and are subject to a number of procedural and economic disadvantages. Particularly is this true as to the production of the darker shades.

In addition to preparing these pigments as "pure" types, i. e., forms in which the solid solution is the principal constituent, they are also commonly prepared as "lithopone" or "extended" types. This is usually done by including a suitable amount of an inert "extender" such, for example, as $BaSO_4$, in the "crude" before calcination. These extenders may be incorporated in the crude in any desired manner, usually, however, by coprecipitation with one or more of its components. The process of the present invention is readily adapted and its advantages equally applicable to the manufacture of either pure or extended forms.

In the past, cadmium red pigments, such as those with which the present invention is concerned, have been obtained by combining a series of procedural steps, each in turn selected from various proposals, to produce a calcinable crude. Such procedures may be roughly divided into two general classifications; precipitation of the crude as "compounds" of indefinite structure, usually designated as cadmium sulfo-selenides; and preparation as a mechanical "mixture" of the components.

The sulfo-selenide type of crude is usually obtained by dissolving selenium in a sodium or barium sulfide liquor and carrying out a strike of this liquor and a solution of a soluble cadmium salt. The resultant cadmium-bearing precipitate is used as the crude. In preparing the "mixture" type of crude, CdS is separately prepared and then combined, usually in a slurry, with a CdO reactant, which may be CdO per se or a compound reducible during calcination to CdO; and with an Se reactant, preferably elemental Se. In either type of preparation, some sulfur is also usually present in the crude.

In either case, the crude to be calcined, however prepared, is collected, dried if necessary, and finally calcined. At suitable temperatures, this results in conversion of at least part of the selenium and an equivalent amount of cadmium compound or compounds to CdSe. This reaction is accompanied by the concurrent liberation of sulfur dioxide and also, in previously-used processes, some free sulfur which is volatile and eliminated at the usual calcination temperatures of about 1000°–1400° F.

However, the "sensitivity" of the crude to calcination has a very marked effect on the quality of the final pigment product. In the present discussion, the term an "insensitive" crude is used to designate a composite which on calcination exhibits only minor changes in the product per unit change in the heat treatment. A "sensitive" crude is used to refer to a composite that exhibits considerable variation in mass tone and tinting strength for each unit change in the heat treatment.

Neither type is wholly desirable. An insensitive crude even when calcined under optimum conditions, yields a product which is deficient to standard. An overly sensitive crude, on the other hand, sinters so severely that a high quality product is never obtained. If a crude having the correct degree of sensitivity could be produced, it would be expected on calcination to yield an optimum quality pigment. In the past, however, the conditions which govern sensitivity have been considered to be too critical and complicated to be subject to regulation by methods which are both simple and reliably duplicated.

It is, therefore, the object of the present invention to devise a method which will enable the production of crude composites which on calcination meet the desired conditions. They must be sufficiently sensitive to enable reliable reproduction of the optimum mass tone and tinting strength, without being subject to excessive sintering. These objects have been found to be simply and readily obtained by insuring the presence during calcination of a controlled optimum amount of fluxing salts.

While the present invention is not limited thereto, it is well illustrated in preparing cadmium red pigments in accordance with the process set forth in my copending application, Serial No. 680,098, filed of even date. In that application a process is set forth comprising the calcination at from about 1000°–1400° F. of a crude obtained by slurrying together individual slurries of cadmium sulfide; cadmium oxide, usually as a material reducible thereto during calcination such as cadmium carbonate; and powdered elemental selenium. The composite should contain Se and $CdCO_3$ in such amounts that the Se:CdO ratio is 3:2, whereby the formation of CdSe during calcination will be in accordance with the reaction

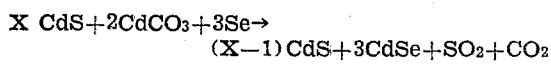

Preferably, also, the composite should be free from uncombined sulfur. Since, as noted above the CdS and CdSe proportions in the finished pigment control the color of the pigment, the final shade will be varied with the value of X in the above reaction. Therefore, in illustrating and discussing the process of the present invention this preferred process will be used.

Preparation of CdS for use in accordance with the preferred process of the present invention is normally by the reaction of a cadmium salt, preferably the sulfate, with a metal sulfide. For example, if a "pure" type pigment is to be made, this is usually $Na_2S$ to produce a soluble sulfate and precipitate CdS. Normally, if a slurry of this precipitate is combined directly with the other slurred components of the crude, the latter is too sensitive to calcination. This is partly due to the fine particle size of the CdS so obtained and partly to its high content of adsorbed and/or entrained soluble salts.

It would seem simple to remove these salts by washing, thereby overcoming the difficulty. However, any attempt to do so is physically limited. The salts appears to have a flocculating effect. Washing is limited by the thixotropic and dispersive character of the slurry resulting from a reduction of the soluble salts content to below the flocculating point. A CdS slurry which has been washed to the optimum point imposed by these physical effects will still have a water-soluble salt content of about 1.5–3.0%, which is too high to permit optimum calcination if carried over into the crude.

As noted above, in the preferred practice of this invention the CdS slurry usually is admixed with separately prepared $CdCO_3$ and Se slurries to produce a composite crude which is dewatered, dried and calcined. In so doing, difficulty with an excess of water-soluble salts in the CdS slurry is partially offset. The $CdCO_3$ seems to discharge or release a part of the water-soluble salts from the CdS and they are removed during dewatering. Otherwise, the latter would be preferentially calcined and a good quality product would never be obtained. Nevertheless, even after such mixing and normal dewatering, the crude still contains sufficient water-soluble salts to result in too great sensitivity during calcination.

To overcome this objectionable situation necessitates either a further reduction in salts content or the addition thereto of an anti-fluxing agent to offset their effect on calcination. Further reduction in salts content is impractical because of the excess number of washing operations required. On the other hand, past attempts to add an anti-fluxing agent have not been productive of a satisfactory solution because of the difficulties in selecting and adding the correct amount.

In accordance with the present invention it has been found that these difficulties may be readily overcome. This is done by a combination of two factors. First, a suitable anti-fluxing agent is added at the correct point in the process to overcome the excessive fluxing effect of the normally expected salts content of crude. A sufficient amount is used to insure the crude being insensitive. Secondly, a sufficient amount of fluxing salts is subsequently added to produce a predetermined fluxing effect.

The most desirable point of addition of the anti-fluxing agent appears to be as an end-treatment in the preparation of the CdS. Accordingly, the anti-fluxing material is added to a slurry of the CdS precipitate. If so desired, the precipitate may be washed either before or after the material is added. While the choice of anti-fluxing agents may be from a number of materials, they must be insoluble. For the purpose an insoluble phosphate is preferable. To be thoroughly disseminated in the precipitate they are preferably formed in situ. This is easily done by adding phosphoric acid to a slurry of precipitated CdS and precipitating an insoluble phosphate, either by means of $(Ba)^{++}$ ions already present or by adding some material such as aluminum sulfate specifically for the purpose.

The amount used will depend somewhat upon the amount of soluble salts present after washing. Usually about 0.2 to about 1.0% of the weight of the CdS, or, for a lithopone type, of the total pigment, in the slurry is normally adequate. Other factors being equal, a good general practice is to add an amount equivalent to about 0.2–0.6% by weight of the total solids.

This treatment will account for the soluble salts introduced into the composite in the manufacture of the CdS slurry when a pure type pigment is being prepared. In making an extended type, in which the $CdSO_4$ is reacted with BaS to precipitate both CdS and $CaSO_4$ this is not so important a consideration. The present invention therefore has a most noticeable improvement over past processes in the preparation of pure type pigments.

A second source, applicable to the manufacture of both pure and extended types, is in conjunction with the preparation of the CdO, which as noted above is usually added in the form of $CdCO_3$. The cadmium carbonate is ordinarily prepared by the strike of an aqueous solution of some cadmium salt, preferably the sulfate, and a solution of sodium bicarbonate. Although a large proportion of the salts introduced in this reaction may be washed out of the resultant precipitate, it is not practical to reduce the salts content to less than about 0.5% of its original content. In using a slurry of CdS, which has been end-treated with an insoluble phosphate, as set forth above, in the making of the composite this does no harm. The antifluxing material introduced in the end-treatment of the CdS precipitate is ordinarily quite adequate to offset an excessive fluxing effect of the salts from this source.

From the foregoing discussion it will be seen that when using the end-treated CdS slurry the composite CdS, $CdCO_3$ and Se mixture, after normal washing and repulping, will have a water-soluble salts content low enough so that the crude will be relatively insensitive to calcination. Further, it then can be easily and directly adjusted to the proper degree of sensitivity to calcination by adjusting the total amount of fluxing salts present to the correct level.

Final adjustment of the flux content is obtained by adding predetermined amounts of substantially any water-soluble sodium or potassium salts. The salt should be compatible with the product and therefore the sulfate is probably preferable for the purpose, although the invention is not necessarily limited thereto. Some salts will be present in the washed and repulped composite, even though the fluxing effect thereof is inadequate or offset. It has been found that a good practice is to add sodium or potassium sulfate to the composite in amounts approximately equivalent to the residual molecular equivalents of soluble salts in the composite, calculated as sodium sulfate.

While the added fluxing agent may be either the sodium or the potassium salt, the potassium salt is preferable since this produces an approximately equimolecular amount of the sodium and potassium salt in the final crude before calcination. This appears to produce pigment development without excessive sintering, somewhat better than when either salt is present alone. The effect, however, is small and the invention is not limited thereto.

Actually, the amount of sodium or potassium salt added is usually small. The amount of soluble salts present in the composite is readily determined by pulping a measured quantity with distilled water and testing the conductivity. It will usually vary from about 0.10 to as high as about 0.5%, normally about 0.3–0.4%. Adding an approximately equal amount will therefore produce a total of from about 0.5% to about 1.0%. Where testing facilities are not available, a good average practice is to add about 0.3–0.5% of a potassium salt.

The invention will be more fully illustrated in conjunction with the following examples which are intended as illustrative only and not by way of limitation. All parts are by weight unless otherwise noted.

EXAMPLE 1

*Extended Pigment—Light Red Shade*

A CdS lithopone slurry was formed by a strike of sufficient 1.76 molar $CdSO_4$ liquor and 0.72 molar BaS liquor to precipitate a total of $CdS+BaSO_4$ of about 540 parts which was treated with a 0.03 mol excess of BaS per mol of CdS, with 1.62 parts of $H_3PO_4$, an amount about equivalent to 0.3% of the solids weight, and filtered, the filter cake being washed and repulped to a volume of about 2000 parts. A $CdCO_3$ reactant was prepared by a strike of sufficient 1.76 molar $CdSO_4$ liquor with 1.2 molar solution of $NaHCO_3$ to produce 65.3 parts of $CdCO_3$ which was washed sufficiently to reduce the soluble salts content to about 1.3% of the initial content and repulped to about 435 parts. A Se reactant was prepared by pulping 45.3 parts of powdered Se metal at 50% solids with a 0.5% aqueous BaS solution. A composite slurry was prepared by adding the Se reactant to the CdS slurry and then adding the $CdCO_3$ slurry, thoroughly mixing the whole and adjusting the total volume to about 2500 parts.

To show the effect of the fluxing salt control, one-half of the composite slurry was directly dewatered and dried at 85–95° C. A test by a standardized conductivity procedure indicated that the dried cake contained approximately 0.3% of soluble alkali metal salt, which because of the formulation used comprised essentially $Na_2SO_4$. This was designated as Sample A.

To the remaining one-half of the composite slurry was added about 3.5 parts of $K_2SO_4$, this being approximately an equi-molecular amount to the sodium sulfate present. A conductivity test indicated about 0.6% of water-soluble salts. This slurry was then dewatered and dried at about 85–95° C. This cake was designated as Sample B.

Both Samples A and B were calcined in an electric muffle furnace in a non-oxidizing atmosphere of $CO_2$ for 15 minutes at temperatures from an initial 1100° F. to a final 1200–1250° F., the calcined pigments being quenched, filtered and dried. The dried pigments were evaluated by mulling the pigment in linseed oil at a pigment content of about 70%. Rubouts of the mixture were taken for examination of the mass tone and zinc oxide reductions prepared for examination of the tint tone. Both the mass tone and the tint tone of the pigment obtained from Sample B were superior to those from Sample A, the mass tone being both brighter and cleaner and the tint tone being appreciably cleaner.

For purposes of comparison, reflectance curves of both the mass tone and the reduced tint tone rubouts of both samples were taken. These are shown in Figure 1 in which the curves designated A—1 and A—2 are respectively the reflectance curves for the mass tone and tint tone rubouts obtained from Sample A, and B—1 and B—2 designate the corresponding curves of the pigment obtained from Sample B. Comparison of these curves indicates the clear superiority of the pigment from Sample B.

EXAMPLE 2

*"Pure" Type Pigment—Orange Shade*

380 parts of CdS were precipitated by a simultaneous strike of 2.35 molar $CdSO_4$ liquor and 1.0 molar $Na_2S$ liquor, the resultant slurry being treated with a 0.05 mol per mol of CdS excess of $Na_2S$, with 3.8 parts of $H_3PO_4$ and an equivalent quantity of $Al_2(SO_4)_3$ and filtered, the filter cake being washed and repulped to about 2000 parts. The $CdCO_3$ reactant was prepared as in Example 1 to obtain 96 parts of $CdCO_3$ slurried to a total volume of 630 parts and the Se reactant was prepared by slurrying 66.5 parts of Se powder at 50% solids in a 0.5% aqueous BaS solution.

The Se slurry and the $CdCO_3$ slurry were successively added to the CdS slurry and the whole admixed and adjusted to a total volume of 3500 parts. One-half this slurry was directly dewatered and dried, the resultant cake being designated as Sample C. The remainder was supplemented by adding an amount of $Na_2SO_4$ approximately equal to that already present and then dewatered and dried. The resultant cake was designated as Sample D. Sample C contained about 0.4% and Sample D about 0.8% respectively of water-soluble salts calculated as $Na_2SO_4$ equivalents.

Sample C was calcined for 12 minutes from an initial temperature of 1100° F. to a final temperature of 1300° F. Sample D was also calcined for 12 minutes but at temperatures from an initial 1050° F. to a final 1250° F.

Figure 2:
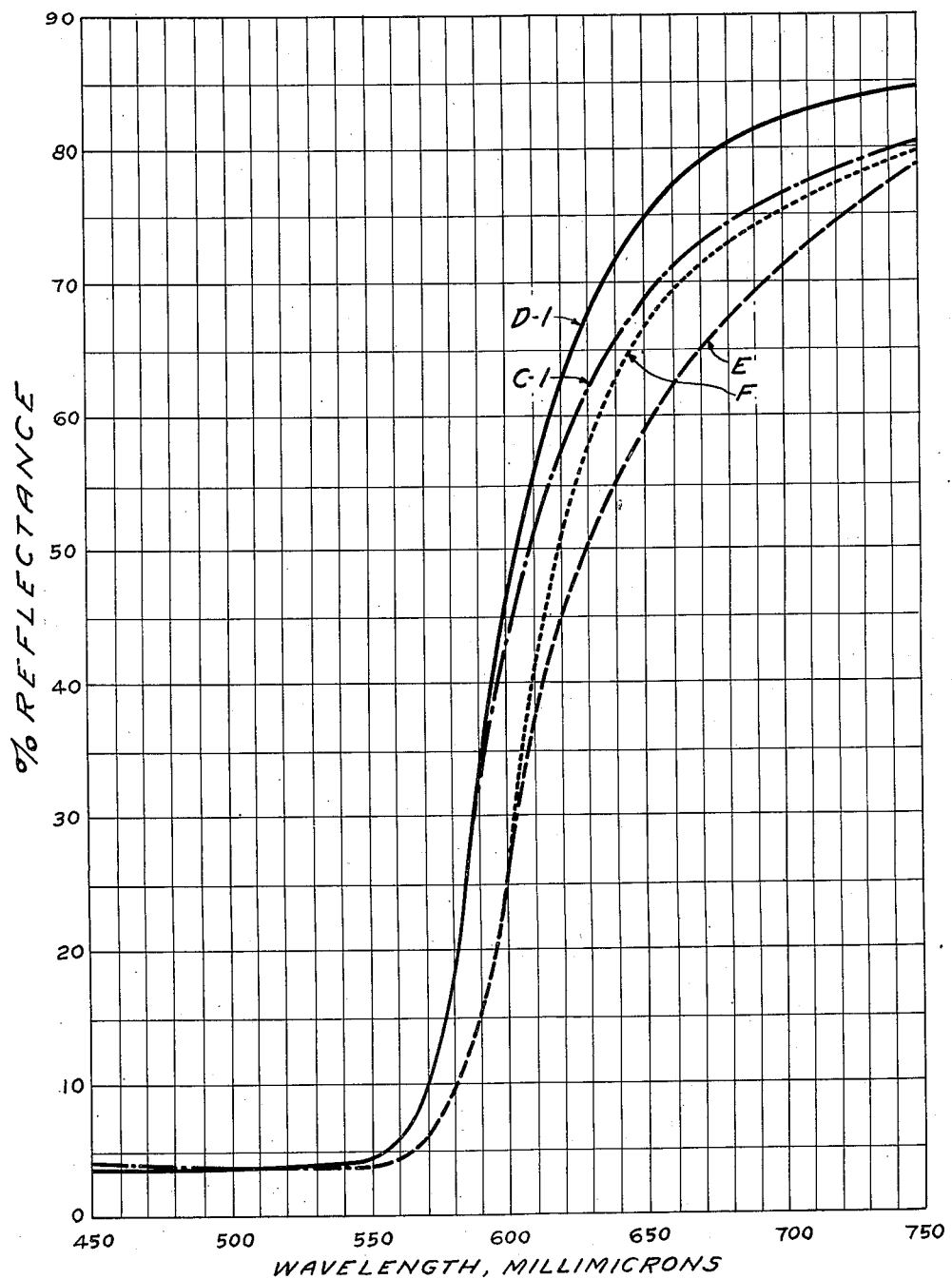

As in Example 1, the products were assayed by preparing rubout tests in oil for mass tone and tint tone evaluations. The mass tone of the pigment from Sample D was both cleaner and brighter than that from Sample C and the tint tone from Sample D was definitely superior. Spectrophotometric curves showing the marked distinction in the red end of the spectrum of both pigments are shown in Figure 2 in which curves C and D represent the curves obtained from the mass tone rubouts of Samples C and D respectively.

EXAMPLE 3

"Pure" Type—Light Red Shade

Example 2 was repeated using 280 parts of CdS in a 2000 parts by volume slurry, 95.8 parts of $CdCO_3$ in a 705 parts by volume slurry, and 66.4 parts of Se in a 50% solids slurry, the composite slurry being adjusted to a total volume of 3000 parts.

1500 parts of the composite slurry was directly dewatered and dried, the filter cake containing 0.3% of water-soluble salts which was designated as Sample E, and the remaining 1500 parts having added thereto sufficient $K_2SO_4$ to produce a water-soluble salts content of about 1.0% before being dewatered and dried, yielding a filter cake designated as Sample F. Sample E was calcined for 10 minutes over a temperature range from an initial of 1100° F. to a final of 1350° F. and Sample F being calcined for over 10 minutes from an initial temperature of 1000° F. to a final temperature of 1250° F.

The resultant pigments were of a light red shade, that from Sample F being brighter and cleaner in mass tone and much cleaner in tint tone than that from Sample E. Rubouts in oil to evaluate mass tone and tint tone were made. Spectrophotometric curves of the mass tone rubouts are shown in Figure 2 in which curves E and F are those of the pigments obtained from Samples E and F respectively.

EXAMPLE 4

"Pure" Type Pigment of Medium Red Shade

Example 2 was repeated using 268 parts of CdS in a 2000 parts by volume slurry, the precipitate being treated with 0.5% by weight of $H_3PO_4$ and an equivalent amount of $Al_2(SO_4)_3$. 107 parts of $CdCO_3$ were suspended in a 800 parts by volume slurry having a final salt content of 0.6% that of the initial salts. 74.4 parts of Se were formed into a 50% solids slurry. The slurries were combined as in Example 2 and washed to a soluble salts content, as equivalents of $Na_2SO_4$, of about 0.2%.

Figure 3:
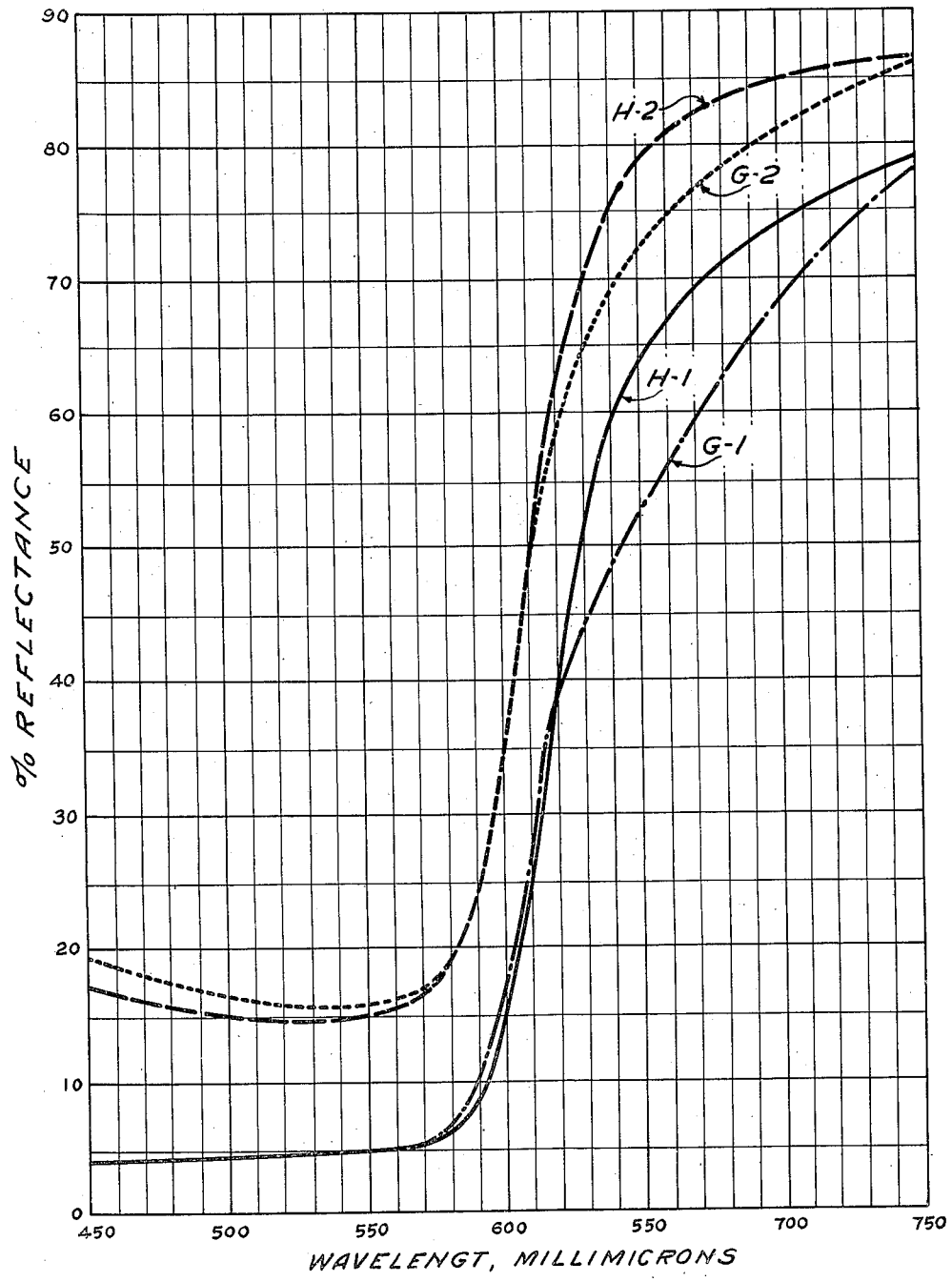

One-half this slurry was dewatered and dried directly to obtain the filter cake as Sample G. The remaining portion of the slurry was adjusted to a total water-soluble salts content of 1.0% with $K_2SO_4$ and dewatered and dried to obtain a filter cake as Sample H. These samples were calcined over a 10 minute period, Sample G at from 1100° F.–1350° F. and Sample H at from 1000° F.–1250° F. Rubouts of the resultant medium red pigments indicated that the pigment from Sample H was both brighter and cleaner in mass tone and cleaner in tint tone than the pigments from Sample G. Spectrophotometric curves of the rubouts of both the mass tone and the zinc oxide reduced tint tone samples are shown in Figure 3 in which curves G—1 and G—2 are those of the mass tone and tint tone rubouts of the pigment from Sample G and curves H—1 and H—2 are the corresponding curves for the pigment from Sample H.

EXAMPLE 5

"Pure" Type Pigment of Maroon Shade

Example 2 was repeated using 279 parts of CdS treated with 1% by weight of $H_3PO_4$ and an equivalent weight of $Al_2(SO_4)_3$ in a 2000 parts by volume slurry; a 177 parts of $CdCO_3$ in a 1200 parts by volume slurry and 123 parts of Se powder as a 50% solids pulp. The combined slurries were adjusted to a total volume of 3500 parts, 1750 parts thereof being directly dewatered and dried to produce Sample I and which contained 0.2% water-soluble salts and the remaining 1750 parts being adjusted with $Na_2SO_4$ to produce a filter cake containing 1.0% water-soluble salts as Sample J.

Samples I and J were calcined over 10 minutes, Sample I at from 1200° F.–1400° F. and Sample J at from 1200° F.–1350° F. Rubouts of the resultant pigments which possess a maroon shade indicated that the product from Sample J was definitely superior in both mass tone and tint tone than the pigment from Sample I.

I claim:

1. In producing cadmium red pigments by calcining a mixture of a cadmium sulfide reactant, powdered selenium and a cadmium oxide reactant selected from cadmium oxide and compounds easily calcinable to cadmium oxide; the improved method of controlling the fluxing properties of the mixture which comprises: forming the cadmium sulfide reactant by a strike of an aqueous cadmium salt solution and a solution of a salt selected from the group consisting of the alkali metal and barium sulfides; washing the water-soluble salt content of the resultant thixotropic precipitate down to the about 1.5–3.0% limit which cannot be practically reduced by washing due to the thixotropic nature of the precipitate and supplementing the precipitate with about 0.2–1.0% of the total pigment weight of a water-insoluble phosphate anti-fluxing agent; forming a slurry of the so-treated precipitate; combining that slurry with slurries of the powdered selenium and the cadmium oxide reactant, whereby a composite mixture is obtained; washing the composite to a soluble-salt content, when dewatered, of about 0.1–0.5% of the solids; adding sufficient water-soluble salt, selected from the group consisting of the salts of sodium, potassium and mixtures thereof, to raise the total water-soluble salt content to about 0.5–1.5% of the solids, dewatering and drying the resultant composite.

2. A process according to claim 1 characterized in that the anti-fluxing agent is an insoluble aluminum phosphate.

3. A process according to claim 1 in which the cadmium sulfide precipitate is washed after adding the anti-fluxing agent.

4. A process according to claim 1 in which the fluxing salt added to the washed composite is a sulfate.

GUY C. MARCOT.

REFERENCES CITED

The following references are of record in the file of this patent:

UNITED STATES PATENTS

| Number | Name | Date |
|---|---|---|
| 2,148,194 | Drucker | Feb. 21, 1939 |
| 2,248,408 | Juredine | July 8, 1941 |

FOREIGN PATENTS

| Number | Country | Date |
|---|---|---|
| 299,797 | Great Britain | 1928 |